United States Patent
Ogura Iwasaki et al.

(10) Patent No.: US 12,019,780 B2
(45) Date of Patent: *Jun. 25, 2024

(54) MEMORY DEVICE DATA SECURITY BASED ON CONTENT-ADDRESSABLE MEMORY ARCHITECTURE

(71) Applicant: Micron Technology, Inc., Boise, ID (US)

(72) Inventors: Tomoko Ogura Iwasaki, San Jose, CA (US); Manik Advani, Fremont, CA (US); Samir Mittal, Palo Alto, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,071

(22) Filed: Jan. 19, 2023

(65) Prior Publication Data
US 2023/0161896 A1    May 25, 2023

Related U.S. Application Data

(63) Continuation of application No. 16/727,682, filed on Dec. 26, 2019, now Pat. No. 11,568,077.

(51) Int. Cl.
*G06F 21/62* (2013.01)
*G06F 12/10* (2016.01)

(52) U.S. Cl.
CPC .......... *G06F 21/6227* (2013.01); *G06F 12/10* (2013.01); *G06F 2212/1052* (2013.01)

(58) Field of Classification Search
CPC .................. G06F 21/6227; G06F 12/10; G06F 2212/1052
See application file for complete search history.

(56) References Cited

U.S. PATENT DOCUMENTS 8,634,247 B1 * 1/2014 Sprouse .............. G06F 12/0246
365/185.17
9,875,799 B1    1/2018 De Santis et al.
(Continued)

FOREIGN PATENT DOCUMENTS

CN    104620226    5/2015
CN    107408022    11/2017
(Continued)

OTHER PUBLICATIONS

"International Application Serial No. PCT/US2020/065647, International Search Report dated Apr. 13, 2021", 3 pgs.
"International Application Serial No. PCT/US2020/065647, Written Opinion dated Apr. 13, 2021", 4 pgs.
(Continued)

*Primary Examiner* — Ayoub Alata
(74) *Attorney, Agent, or Firm* — Schwegman Lundberg & Woessner, P.A.

(57) ABSTRACT

An access request is received. The access request comprises a physical page address corresponding to a primary memory block of a memory device, an input security key, and a logical page address corresponding to the physical page address. The input security key is provided as input to a (CAM) block that stores a plurality of security keys to verify that the input security key matches a stored security key. A location of the stored security key is checked to verify that it corresponds to the logical page address included in the access request based a predetermined mapping. Based on verifying that the stored security key corresponds to the logical page address included in the access request, the physical page address corresponding to the primary memory block is accessed.

20 Claims, 8 Drawing Sheets

(56) References Cited

U.S. PATENT DOCUMENTS

| | | |
|---|---|---|
| 10,141,055 B2 | 11/2018 | De Santis et al. |
| 11,568,077 B2 | 1/2023 | Ogura Iwasaki et al. |
| 2005/0052934 A1 | 3/2005 | Tran et al. |
| 2009/0190404 A1 | 7/2009 | Roohparvar |
| 2011/0153908 A1 | 6/2011 | Schaefer et al. |
| 2012/0218822 A1 | 8/2012 | Roohparvar |
| 2013/0124794 A1 | 5/2013 | Bux et al. |
| 2013/0250686 A1 | 9/2013 | Marukame et al. |
| 2015/0143134 A1 | 5/2015 | Hashimoto |
| 2016/0283160 A1* | 9/2016 | Trika .............. G06F 12/1466 |
| 2017/0345500 A1 | 11/2017 | Tong et al. |
| 2017/0371809 A1 | 12/2017 | Benedict |
| 2020/0125295 A1 | 4/2020 | Jean |
| 2021/0200889 A1 | 7/2021 | Iwasaki et al. |

FOREIGN PATENT DOCUMENTS

| | | |
|---|---|---|
| CN | 107689237 | 2/2018 |
| CN | 115398544 | 11/2022 |
| WO | WO-2021133634 A1 | 7/2021 |

OTHER PUBLICATIONS

"International Application Serial No. PCT US2020 065647, International Preliminary Report on Patentability dated Jul. 7, 2022", 6 pgs.

"Chinese Application Serial No. 202080094425.7, Office Action dated Mar. 11, 2023", with English translation, 7 pages.

"European Application Serial No. 20907136.4, Extended European Search Report mailed Dec. 6, 2023", 9 pages.

* cited by examiner

MEMORY DEVICE DATA SECURITY BASED ON CONTENT-ADDRESSABLE MEMORY ARCHITECTURE

PRIORITY APPLICATION

This application is a continuation of U.S. application Ser. No. 16/727,682, filed Dec. 26, 2019, which is incorporated herein by reference in its entirety.

TECHNICAL FIELD

Embodiments of the disclosure relate generally to memory sub-systems, and more specifically, relate to a content-addressable memory (CAM) architecture to facilitate data security in a memory component.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
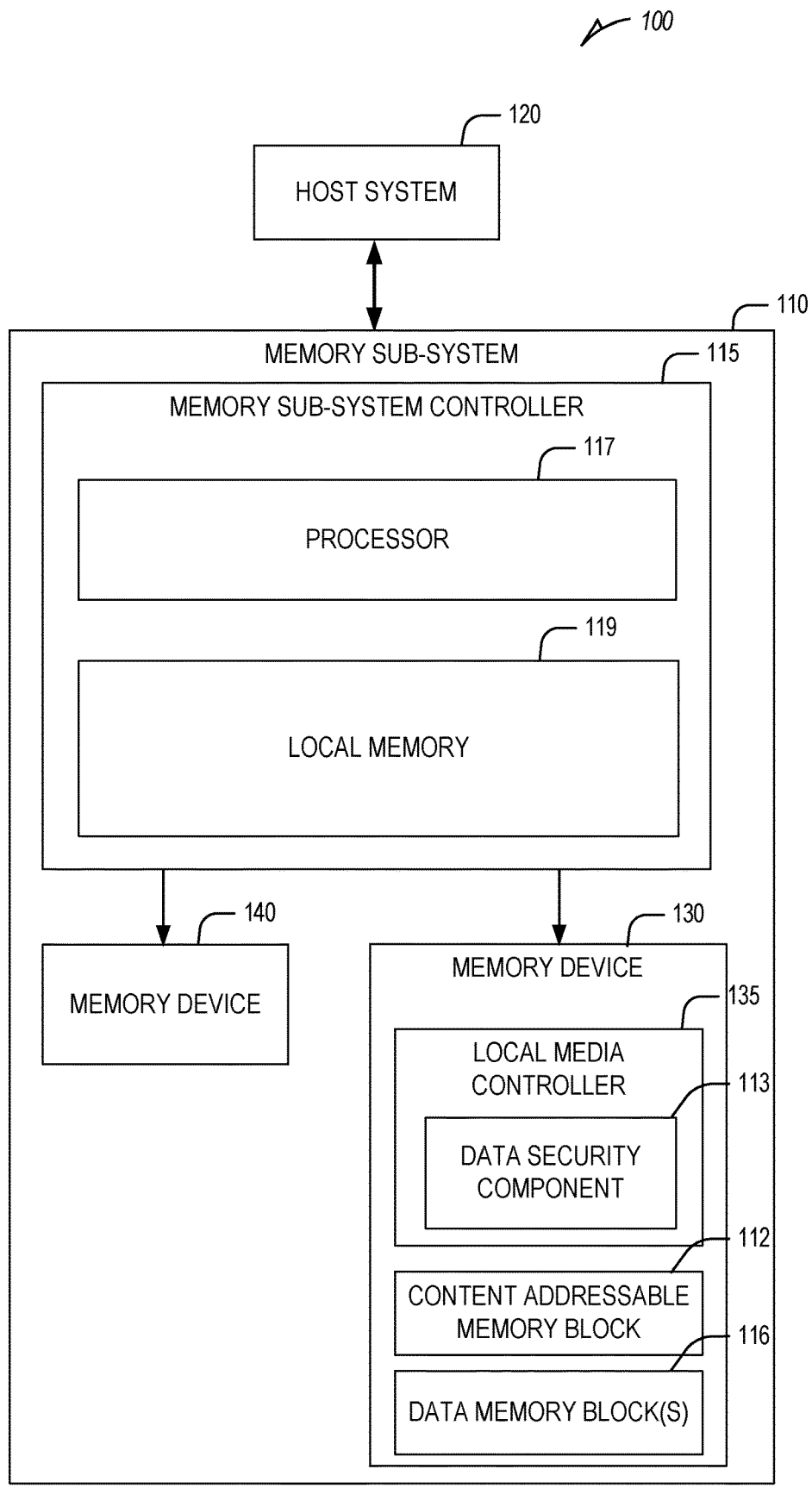
FIG. 1 illustrates an example computing system that includes a secure content-addressable memory (CAM) architecture implemented within a memory sub-system, in accordance with some embodiments of the present disclosure.

Aspects of the present disclosure are directed to a content-addressable memory (CAM) architecture to facilitate data security in a memory component. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

A content-addressable memory (CAM) is a type of memory that is used in certain very high speed searching applications such as identifier (ID) and pattern matching. Generally, a CAM is searched by comparing input search data against a table of stored data entries, and a memory address of matching data in the table is returned. CAMs are frequently implemented in dynamic random-access memory (DRAM), or synchronous random-access memory (SRAM). However, both DRAM and SRAM have a limited memory capacity, which limits the amount of data that can be stored and searched in conventional CAM implementations.

A conventional negative-and (NAND)-type flash memory component may comprise one or more blocks. A NAND block comprises a two-dimensional (2-D) array comprising pages (rows) and strings (columns). A three-dimensional (3D) NAND-type flash memory component comprises sub-blocks of pages (rows) and strings (columns). Multiple sub-blocks form a block. A string comprises a plurality of single NAND flash cells (also referred to hereinafter simply as "memory cells") connected in series. A single NAND flash cell comprises a transistor that stores an electric charge on a floating gate that is isolated by oxide insulating layers above and below. Generally, when there is a charge on the floating gate of a single-level memory cell, the memory cell is programmed and recognized by a memory sub-system as a binary value of 0. When the floating gate of a memory cell has no charge, it is erased and recognized as a binary value of 1. Put simply, the programmed memory cell has a high threshold voltage (Vt), and conversely, the erased cell has a low Vt.

A string is the minimum unit in a NAND-type flash memory component. NAND-type flash components typically have 32 or more memory cells. Conventionally, each memory cell is used to represent a bit value (0 or 1). Thus, in conventional implementations, a string with 32 memory cells can represent 32 bits of data and a string with 64 memory cells can represent 64 bits of data.

In a NAND-type flash memory block, individual strings are connected to allow storage and retrieval of data from selected cells. All strings in the block are connected at one end to a common source line and at the other end to a bit line. Each string also contains two control mechanisms in series with the memory cells. String and ground select transistors are connected to the string select line and ground select line. Memory cells in NAND-type flash components are connected horizontally at their control gates to a word line to form a page. A page is a set of connected memory cells that share the same word line and select gate on the drain side and are the minimum unit to program. NAND-type flash memory components may have page sizes of 64K or 128K cells. Although conventional NAND-type flash memory has a larger capacity than DRAM and SRAM, it is generally too slow for serial data searching and access.

Conventionally, data is secured in memory components such as NAND-type flash memory components by encrypting the data and/or hashing at different or multiple levels within the memory sub-system. However, if the memory component is removed from such a system, hackers would still be able to read the data out, in its encrypted form, and then try to re-construct it. Furthermore, encryption and decryption of memory adds to significant performance and power overhead.

Aspects of the present disclosure address the foregoing and other issues with a CAM architecture implemented in a memory device to facilitate data security within the device. The CAM architecture is not limited to any particular memory device, though the CAM architecture may find particular benefits in NAND type flash memory devices. Through utilization of the CAM architecture, data is secured within a memory device without relying on conventional data encryption. Each data unit within the memory device is unlocked for read and/or write with a secure key that can be many bits wide. In the architecture, the size of the data units is also flexible, with granularities of blocks, pages, or sub-pages.

Consistent with this architecture, one or more CAM blocks are allocated from among primary memory blocks of a memory device to store security keys, each of which corresponds to a data unit (e.g., a block, a page, or a sub-page). That is, each security key stored by the CAM blocks is used to secure data stored in a particular data unit of the memory device. A security key, logical page address (LPA), and physical page address (PPA) are input to the memory device by a memory sub-system controller during read/write access. The security key and LPA originate at the host system and the PPA is provided by the controller, which maintains a logical to physical page map. Before the PPA is accessed, a security match operation is performed to check if the security key exists within the CAM blocks. If there is a match, then the location of the match is checked against the LPA. If the matching security key corresponds to the LPA, then the PPA will be accessed for read or write or erase in the normal way. If there is no match, then the memory will not read or program or erase the data unit.

The security key is known by the host system user and the memory device. From the perspective of the user, the memory sub-system controller is a pass-through entity, and the user's security key is not stored in or known by the memory sub-system controller. It should be noted that the memory sub-system controller will also need direct access to the memory device in order to manage the memory device's wear leveling and garbage collection operations. To handle this, an independent layer of security between the memory sub-system controller and the memory device may be used. This layer may manifest in multiple ways such as a single security key to unlock the entire device, or a unique security key per data unit. Security is maintained because the access between memory sub-system controller and memory device are not passed to the host system or users.

A CAM-based security architecture, as described herein, allows data stored by a memory component to be partitioned to be locked for read or write with unique security keys at different granularities such as block, page, sub-page. This may be useful in computing environments where multiple users may share a common NAND storage space. Further, the security keys may be many bits wide (e.g., 64 to 256 bits), which provides strong protection due to the very large number of combinations (i.e., 2^256 combinations) per data unit. Moreover, with this approach, multiple users have the option to securely store data in its unencrypted form, within the same memory chip, thereby saving performance and power overhead. In addition, while the host system and the memory component are aware of the security key, the controller may, in some embodiments, be only a pass-through entity. In this way, not only is security risk reduced, the changes to the generic controller design can also be reduced.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and so forth.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, USB interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), and so forth. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The local media controller 135 may include a data security component 113 to facilitate secure access of data memory block(s) 116 of the memory device 130. To this end, any one of the memory devices 130 may be configured to include one or more content-addressable memory (CAM) block(s) 112 to support data security operations. Each of the memory device 130 include at least one primary memory block in which data is stored. A physical page address (PPA) identifies a physical location of the data in the memory device 130. A logical page address (LPA) is a virtual address of data that is used by the host system 120 as a reference to access a data unit corresponding to a physical memory location in the memory device 130. The data unit may correspond to a block, a page, or a sub-page. The memory sub-system controller 115 maintains an LPA to PPA map to process access requests received from the host system 120.

A CAM block 112 comprises one or more arrays of memory cells organized as strings. Each string is associated with a LPA in accordance with a predefined mapping and stores a security key corresponding to the LPA. Each security key is used to secure a data unit within the memory device 130. A data unit may comprise a block, a page, or a sub-page. In this way, data stored by the memory device can be partitioned to be locked for read or write with unique security keys at different granularities.

Each string in the CAM block 112 comprises memory cells connected in series between a match line and a page buffer. That is, a CAM block 112 comprises multiple match lines and each match line is connected to one of multiple strings in an array. The match lines of a CAM block 112 correspond to bit lines of the NAND block on which the CAM block 112 is implemented. Within a given string, memory cells are organized as complementary memory cell pairs. Each bit value of the security key stored by a string is mapped to one of the complementary memory cell pairs in the string.

Figure 2:
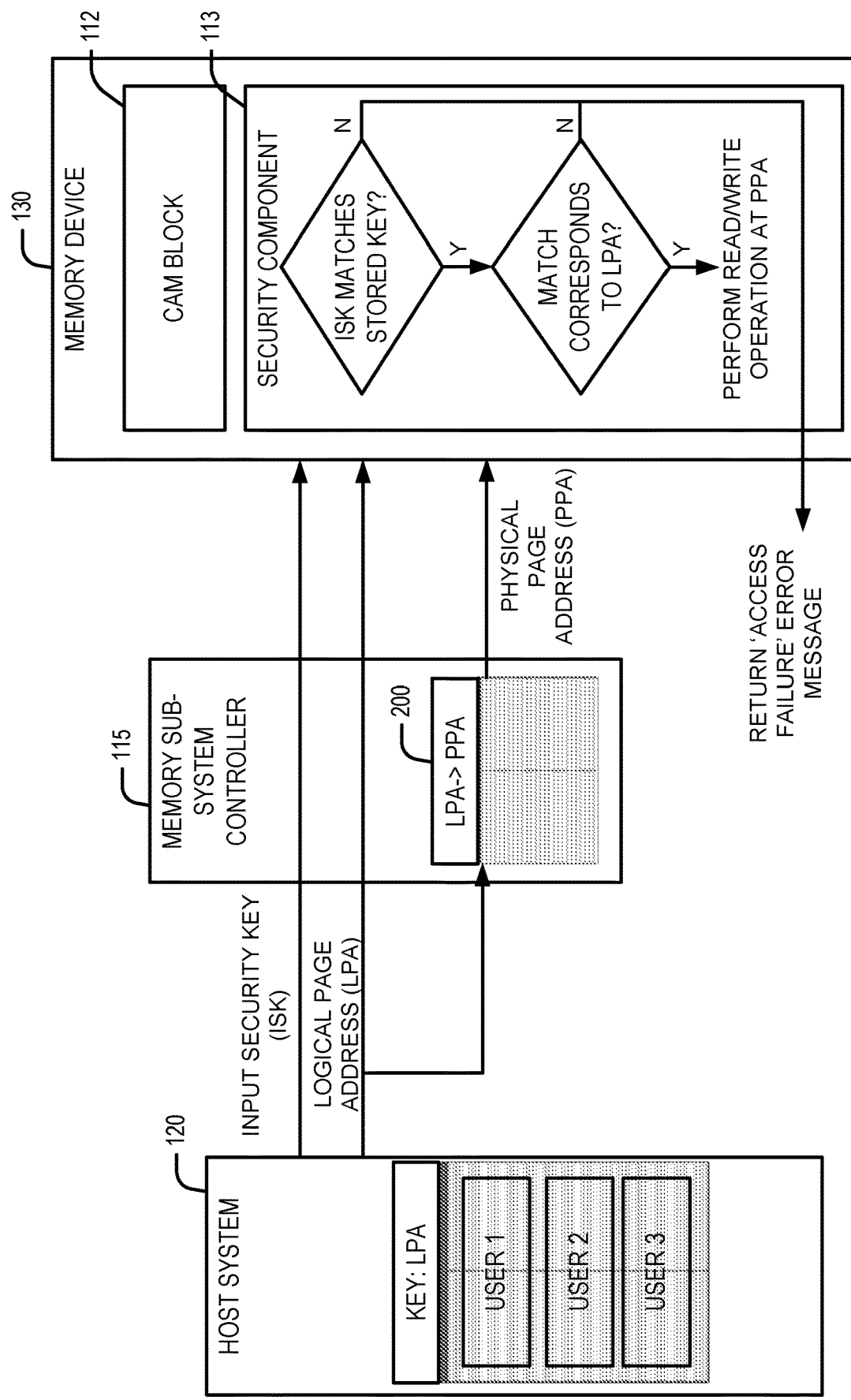
FIG. 2 illustrates example interactions between components of the example computing environment in performing a method for securely accessing data stored by the memory sub-system, in accordance with some embodiments of the present disclosure.

With reference to FIG. 2, example interactions between the host system 120, memory sub-system controller 115, and memory device 130 in performing a method for securely accessing data stored in data block(s) 116 of the memory sub-system 110 are illustrated, in accordance with some embodiments of the present disclosure. As shown, the host system 120 provides an access request to the memory sub-system controller 115 that specifies a LPA corresponding to a requested data unit along with a security key associated with the LPA. The memory sub-system controller 115, in turn, uses a predefined LPA to PPA map 200 to identify a PPA corresponding to the LPA included in the request.

The memory sub-system controller 115 provides the LPA, PPA, and security key to the memory device 130. The data security component 113 of the local media controller 135 determines whether the security key matches a security key stored by the CAM block 112. For example, the data security component 113 may provide the security key as input to the CAM block 112 and the CAM block 112, in turn, provides an indication of whether the input security key matches a stored security key. If the data security component 113 determines that the input security key does not match a stored security key, the data security component 113, in some embodiments, returns an error message to the memory sub-system controller 115 to indicate that the access request has failed. In some embodiments, the data security component 113 may instead return random data.

If the input security key matches a stored security key in the CAM block 112, the data security component 113 verifies that the matching security key corresponds to the LPA included in the access request. If the matching security key corresponds to a different LPA, the data security component 113 returns a message to the memory sub-system controller 115 to indicate that the access request has failed. If the matching security key corresponds to the LPA included in the request, the local media controller 135 accesses the PPA in accordance with the request.

It shall be appreciated that the data security component 113 is not limited to implementations within the local media controller 135 indicated in FIG. 1. For example, in some embodiments, the data security component 113 may be included in the memory sub-system controller 115. In some embodiments, the memory sub-system controller 115 includes at least a portion of the data security component 113. For example, the memory sub-system controller 115 can include the processor 117 (processing device) configured to execute instructions stored in the local memory 119 for performing the operations of the data security component 113 described herein. In some embodiments, the data security component 113 is part of the host system 120 of FIG. 1 and FIG. 2, an application, or an operating system.

Figure 3:
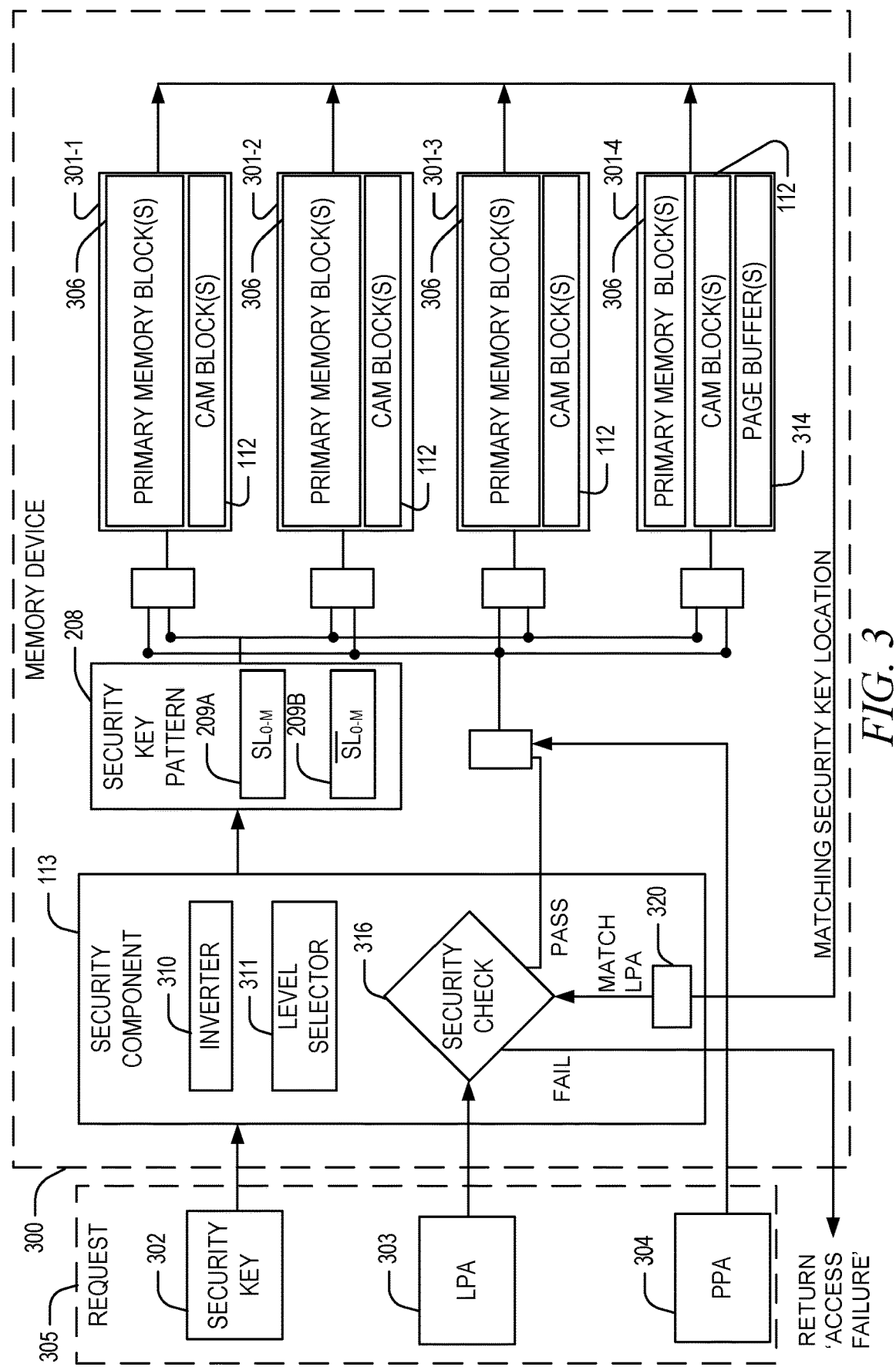
FIG. 3 is a block diagram illustrating additional details of the secure CAM architecture implemented within the memory sub-system, in accordance with some embodiments of the present disclosure.

FIG. 3 is a block diagram illustrating additional details of the CAM architecture implemented within the memory sub-system 110, in accordance with some embodiments of the present disclosure. As shown in FIG. 3, a memory device 300 may be organized into multiple planes—planes 301-1 to 301-4. The memory device 300 is an example of one of the memory devices 130. Although FIG. 3 illustrates the memory device 300 as comprising four planes, it shall be appreciated that the memory device 300 is not limited to four planes, and in other embodiments, may comprise more or fewer planes. Each of the planes 301-1 to 301-4 is configured to include one or more secure CAM blocks 112. The number of CAM blocks 112 per plane may be configured via software or hardware.

As shown, the data security component 113 receives an input security key 302, a LPA 303, and a PPA 304. The input security key 302, LPA 303, and PPA 304 may be included in an access request 305 received from the memory sub-system controller 115. The access request 305 may correspond to a request to read data from or write data to a location in a primary memory block 306 corresponding to the PPA 304. The memory sub-system controller 115 may generate the request 305 based on a request received from the host system 120. For example, the host system 120 may submit a request to the memory sub-system controller 115 that includes the input security key 302 and the LPA 303. The memory sub-system controller 115 may, in turn, identify the PPA 304 corresponding to the LPA 303 based on a predetermined mapping, and send the request 305 including the input security key 302, LPA 303, and PPA 304 to the memory device 300.

Upon receiving the request, the data security component 113 verifies that the input security key 302 is a valid security key for the LPA 303. That is, the data security component 113 searches the CAM blocks to verify that the input security key 302 matches a security key stored in one of the secure CAM blocks 112 and that the matching security key corresponds to the LPA 303. To do so, the security component 113 provides the input security key 302 as input to the CAM blocks 112. To provide the input security key 302 as an input to a CAM block 113, the security component generates a security key pattern 208 based on the input security key 302

A binary representation of the input security key 302 comprises a first sequence of bits (e.g., "1011"). The security key pattern 208 generated by the data security component 113 comprises a first set of voltage signals 209A ($SL_{0-M}$) representing the first sequence of bits and a second set of voltage signals 209B ($\overline{SL}_{0-M}$) representing a second sequence of bits comprising an inverse of the first sequence of bits (e.g., "0100").

The data security component 113 comprises an inverter 310 to generate an inverse of the input security key 302 and a level selector 311 to generate the first and second voltage signals. In generating the first and second voltage signals, the level selector 311 may use voltage V_high to represent a binary value of "1" and use a voltage V_low to represent a binary value of "0" where V_high is above a threshold voltage (Vt) and V_low is below it.

To verify the input security key 302 matches stored security key in one of the CAM block(s) 112, the data security component 113 inputs the security key pattern 208 vertically along security lines of the CAM block 112 being searched. Match lines of the CAM block 112 are precharged to facilitate searching. That is, prior to input of the security key pattern 208, a voltage signal (e.g., V_high) is applied to the match lines of the CAM block 112. Although example embodiments described herein involve a method of search that includes precharging bit lines and discharging match lines, it shall be appreciated that in some other embodiments, the method of search may instead include setting a source line to a higher voltage, precharging the bit lines to 0V, and letting the match lines charge up.

Input of the security key pattern 208 causes any complementary memory cell pairs representing a matching stored bit value of the input security key 302 to become conductive. If a string is storing matching data, the entire string becomes conductive. If no matching data is stored, all match lines are non-conductive. Because the match lines are precharged, input of the security key pattern 208 on the security lines causes any match lines in the block that are storing matching data (a security key that matches the input security key 302) to output a discharge signal because the corresponding string is conductive. The discharge signal provides an indication that a matching security key is stored on the string connected to the match line.

Each string is connected between a match line and a page buffer (e.g., comprising one or more latch circuits) and the page buffer of a matched line (e.g., a match line that includes a string storing a matching security key) stores data indicating a matching security key is stored along the matched line in response to the signal provided as a result of the match line discharging along the string. As shown, plane 300-4 includes page buffer(s) 314. A page buffer 314 may comprise one or more latch circuits. Physically, the page buffer(s) 314 may reside under the arrays of memory cells in which CAM block(s) 112 are implemented. For example, the memory device 300 may be designed using a circuit under array (CUA) architecture.

A page buffer 314 latches data based on the signal provided by a matched line when a matching security key is stored by the connected string that conducts the signal to the page buffer 314. The data security component 113 reads data from the page buffer(s) 314 that provides an indicator of whether a matching security key (e.g., a stored security key that is identical to the input security key 302) is stored in the CAM block 112 being searched as output. The data read from the page buffer(s) 314 also indicates a location of a matching security key within one or more of the CAM blocks 112.

The data security component 113 performs a security check 316 based on data read from the page buffer(s) 314. As part of the security check 316, the data security component 113 verifies that the security key 302 matches a stored security key based on the data read from page buffer(s) 314. If the data security component 113 determines that the input security key 302 does not match any of the security keys stored in the CAM block(s) 112, the security check 316 fails and the data security component 113 returns a "access failure" error message to the controller 115, consistent with some embodiments. In some embodiments, if the security check 316 fails, random data may be returned to confuse a person trying to improperly access data.

If the data read from the page buffer(s) 314 indicates that the input security key 302 matches a stored security key, the data security component 113 verifies that the matching security key stored in the CAM block(s) 112 corresponds to the LPA 303 included in the request. The data security component 113 verifies that the matching security key corresponds to the LPA 303 based on the location of the matching security key within the CAM block(s) 112, which is converted to a match LPA by match line location converter 320. For example, each string of the CAM block(s) is associated with a particular LPA and stores the security key for the associated LPA. The location of the matching security key within the CAM block(s) 112 may comprise or otherwise corresponds to an identifier of the string on which the matching security key is stored. Accordingly, given the location of the matching security key, the data security component 113 determines the match LPA associated with the matching security key. The correspondence between a match line location and a match LPA may be determined based on a pre-determined formula or look-up table.

If the data security component 113 determines that the matching security key is associated with an LPA other than LPA 303, the security check fails and the data security component 113 returns an "access failure" error message to the controller 115, consistent with some embodiments. As noted above, in some embodiments, if the security check 316 fails, random data may be returned.

If the security component determines that the matching security key is associated with the LPA 303, the security check 316 passes and the local media controller 135 performs a conventional read or write operation at the location within one of the primary blocks 306 corresponding to the PPA 304 included in the request.

In some embodiments, the security component 113 may perform the read operation at the PPA 304 in parallel with the security check 316. Consistent with these embodiments, the security component 113 returns the read data in response to the security check 316 passing. If the security check 316 fails, the security component 113 discards the read data. In these embodiments, the security component 113 may comprise a multiplexer controlled by a signal generated based on an outcome of the security check 316 (e.g., "high" voltage signal representing a binary "1" to indicate a passed security check 316 or a "low" voltage signal representing a binary "0" to indicate a failed security check 316).

In some embodiments, the data security component 113 may sequentially search for matching security keys in the CAM block(s) 112 of the planes 301-1 to 301-4. That is, the data security component 113 may initially search CAM block(s) 112 of the plane 301-1, thereafter search CAM block(s) 112 of the plane 301-2, thereafter search CAM block(s) 112 of the plane 301-3, and finally search CAM block(s) 112 of the plane 301-4.

In some embodiments, the data security component 113 may search for matching security keys in the CAM block(s) 112 of the planes 301-1 to 301-4 in parallel. That is, the data security component 113 may simultaneously search all CAM block(s) 112 of the planes 301-1 to 301-4 to find matching security keys. Parallel searching of the planes 301-1 to 301-4 allows all security keys stored among all CAM block(s) 112 of the planes 301-1 to 301-4 to be searched in a single search operation rather than completing the search of all security keys in four separate search operations. Hence, parallel searching, as utilized in the embodiments described above, may allow the data security component 113 to achieve an increase in search speed relative to embodiments in which sequential searching is utilized.

In some embodiments, security keys may be stored across two or more of the planes 301-1 to 301-4. In these instances, the data security component 113 may simultaneously search for portions of matching security keys across two or more of the planes 301-1 to 301-4. Dividing security keys across planes allows for greater key size when compared to embodiments in which security keys are stored within a single plane. For example, if each of the CAM blocks 112 supports 64-bit keys, dividing the security keys among all four planes would allow the memory device 300 to support 256-bit keys (4*64=256).

To avoid obscuring the inventive subject matter with unnecessary detail, various functional components that are not germane to conveying an understanding of the inventive subject matter have been omitted from FIG. 3. However, a skilled artisan will readily recognize that various additional functional components may be included as part of the memory device 300 to facilitate additional functionality that is not specifically described herein.

Figure 4:
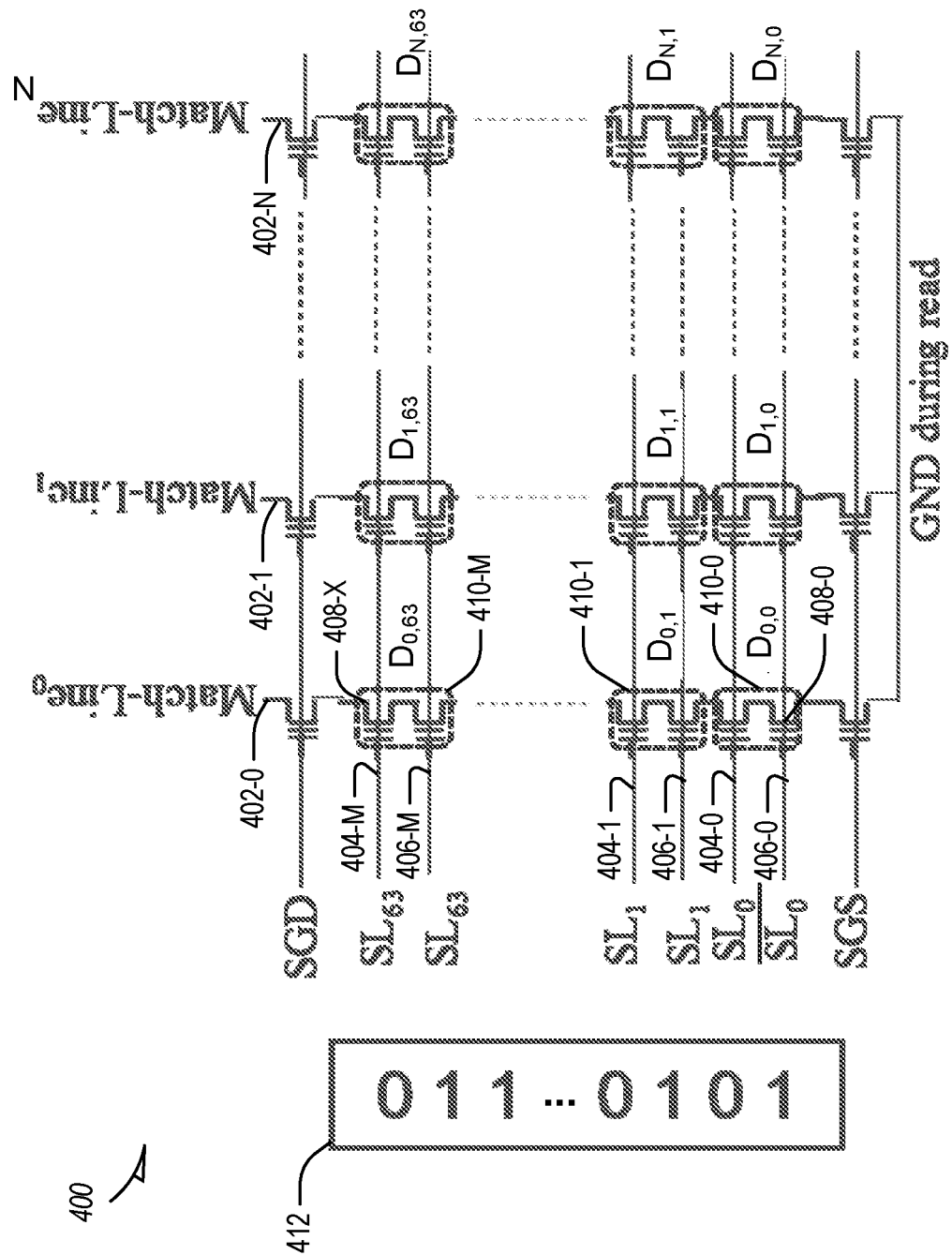
FIG. 4 illustrates components of a secure CAM block implemented within a memory component in the example form of a NAND-type flash memory component, in accordance with some embodiments of the present disclosure.

FIG. 4 illustrates components of a CAM block 400 implemented within one of the memory devices 130 in the example form of a NAND-type flash memory device, in accordance with some embodiments of the present disclosure. The CAM block 400 is an example of the CAM block 112.

As shown, the CAM block 400 comprises match lines 402-0 to 402-N, security lines 404-0 to 404-M, and inverse security lines 406-0 to 406-M. In this implementation, the match lines 402-0 to 402-N of the CAM block 400 correspond to bit lines of a NAND-type flash memory block, and the security lines 404-0 to 404-M and inverse security lines 406-0 to 406-M of the CAM block 400 correspond to word lines of the NAND-type flash memory block.

Each of the match lines 402-0 to 402-N is connected to a string comprising a plurality of memory cells connected in series. For example, match line 402-0 is connected to a string comprising memory cells 408-0 to 408-X, where X=2M. Memory cells in each string of the CAM block 400 are configured to be complementary pairs. For example, with the string connected to match line 402-0, memory cells 408-0 to 408-X are programmed as complementary memory cell pairs 410-0 to 410-M.

Figure 5:
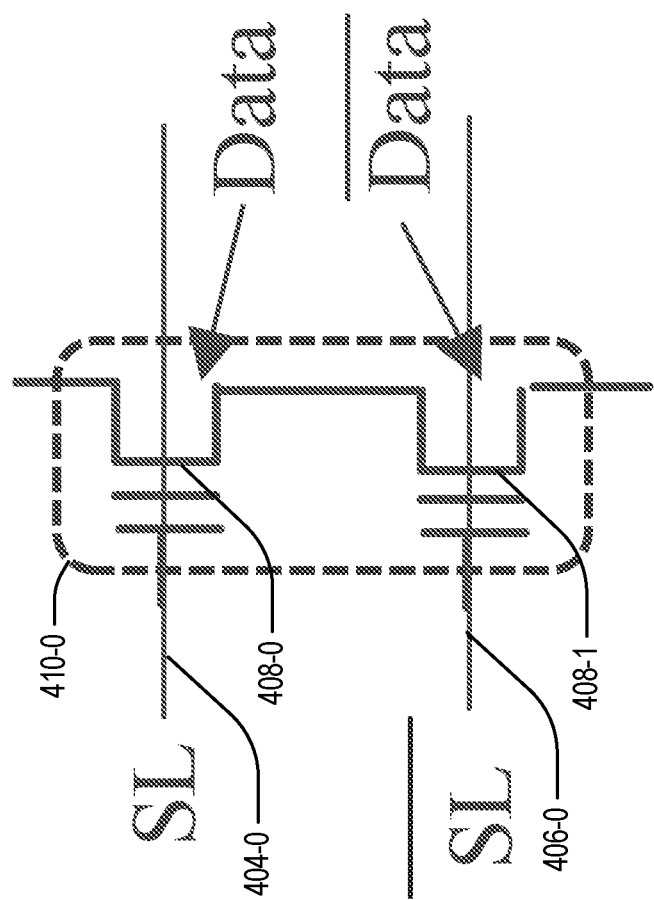
FIG. 5 illustrates a single CAM cell of the secure CAM block implemented within the NAND flash memory component, in accordance with some embodiments of the present disclosure.

Memory cell pairs are configured to be complementary in that one memory cell in the pair stores a data value ("0") and the other memory cell in the pair stores an inverse of the data value ("1"). For example, as shown in FIG. 5, memory cell pair 410-0 comprises memory cells 408-0 and 408-1. Memory cell 408-0 stores a data bit value DATA, and memory cell 408-1 stores $\overline{DATA}$, which is an inverse of the data bit value DATA. Also, as shown in FIG. 5, security line 404-0 is connected to a control gate of the memory cell 408-0 and inverse security line 406-0 is connected to a control gate of the memory cell 408-1.

Security line 404-0 receives a first signal SL representing a single bit value from an input security key and inverse security line 406-0 receives a second signal $\overline{SL}$ representing an inverse of the bit value. If SL matches DATA and $\overline{SL}$ matches $\overline{DATA}$, the memory cell pair 410-0 will be conductive. For example, TABLE 1 provided below is a truth table that defines the behavior of any given one of the memory cell pairs 410-0 to 410-M.

TABLE 1

| SL | $\overline{SL}$ | DATA | $\overline{DATA}$ | CONDUCTIVE |
|---|---|---|---|---|
| 0 | 1 | 0 | 1 | Yes |
| 0 | 1 | 1 | 0 | No |
| 1 | 0 | 0 | 1 | No |
| 1 | 0 | 1 | 0 | Yes |

In TABLE 1, "SL" is a single bit value of an input security key, "$\overline{SL}$" is an inverse of the bit value the input security key, "DATA" is a bit value of a stored security key, and "$\overline{DATA}$" is an inverse of the bit value of the stored security key. As shown, a complimentary cell pair is conductive when the data value of the input security key matches the stored data value corresponding to a stored security key and the inverse of the data value of the input security key matches the inverse of the stored data value corresponding to the stored security key.

Returning to FIG. 3, each string in the CAM block 400 corresponds to an LPA 303 and stores a security key needed to accessed data at the PPA 304 corresponding to the LPA 303. Each data bit value in a security key is mapped to one of the memory cell pairs 410-0 to 410-N in the string. In this way, within each of the complementary memory cell pairs in a string, a first memory cell stores a bit value from the security key and a second memory cell stores an inverse of the bit value from the security key.

In an example where the NAND-type flash memory device supports 128 memory cell strings (i.e., X is 128), the match line 402-0 is connected to memory cell pairs 410-0 to 410-63, which stores a 64-bit security key comprising bit values $D_{0,0}$-$D_{0,63}$. In this example, bit value $D_{0,0}$ is mapped to memory cell pair 410-0 comprising memory cells 408-0 and 408-1. More specifically, memory cell 408-0 stores the bit value $D_{0,0}$ and the complementary memory cell 408-1 stores $\overline{D_{0,0}}$, which is the inverse of the bit value $D_{0,0}$.

A security key may be provided as input by supplying a security key pattern 412 as input vertically along security lines 404-0 to 404-M and inverse security lines 406-0 to 406-M. More specifically, security lines 404-0 to 404-M receive a first set of voltage signals $SL_{0-M}$ representing a security key, and inverse security lines 406-0 to 406-M receive a second set of voltage signals $\overline{SL_{0-M}}$ representing an inverse of the security key. Input of the security key pattern 412 along the security lines causes any string that stores matching data to be conductive because, as discussed above, each individual memory cell pair in the string will be conductive. Because the match lines are precharged, a conductive string allows the match line to discharge. A page buffer connected to a conductive string latches data that indicates a location of matching data (i.e., the security key) in the CAM block 400.

In some embodiments, the data security component 113 comprises a read-out circuit that reads data from the page buffers of the CAM block 400 to identify whether a matching security key is stored by the CAM block 400 and to determine the location of the matching security key.

In some embodiments, two or more page buffers in the CAM block 400 may be tied together to form a serial shift register. Consistent with these embodiments, the security component 113 shifts data out of a first page buffer connected to a matched line to a second page buffer, and the data security component 113 comprises an output compare and counter component to track the number of shifts from one page buffer to the other to identify whether a matching security key is stored by the CAM block 400 and to determine the location of the matching security key.

Figure 6:
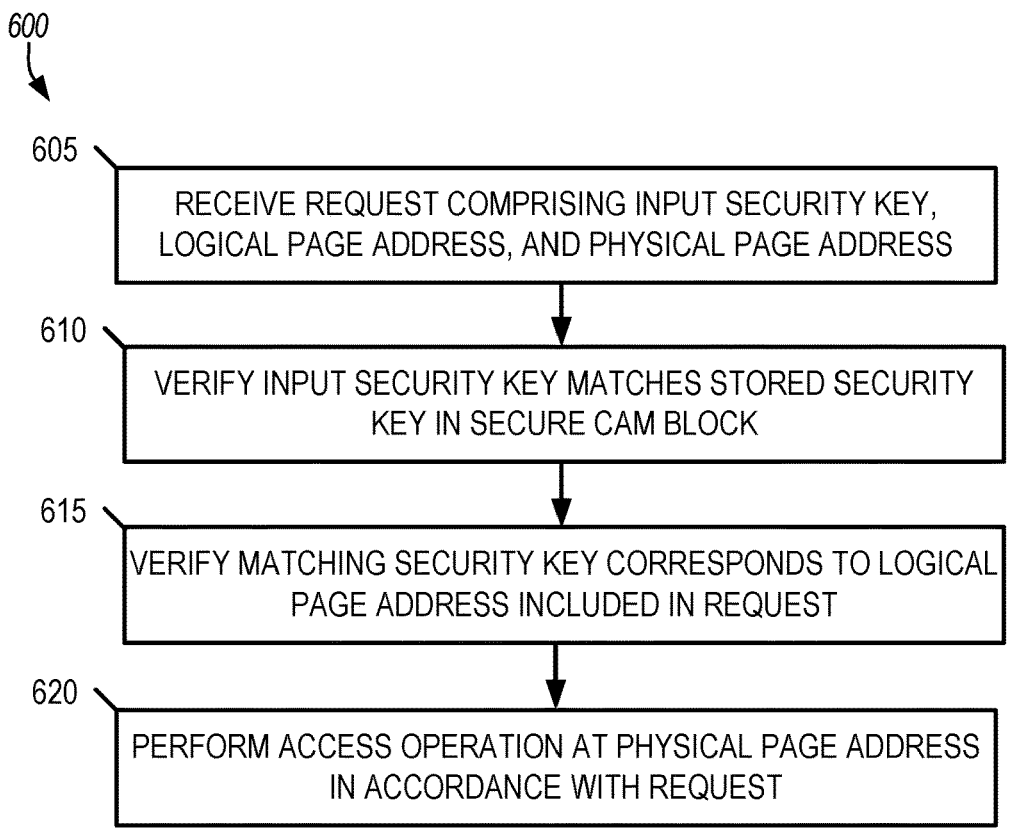
FIGS. 6 and 7 are flow charts illustrating example operations of the memory sub-system in facilitating secure access to a memory device using a secure CAM block, in accordance with some embodiments of the present disclosure.
Figure 7:
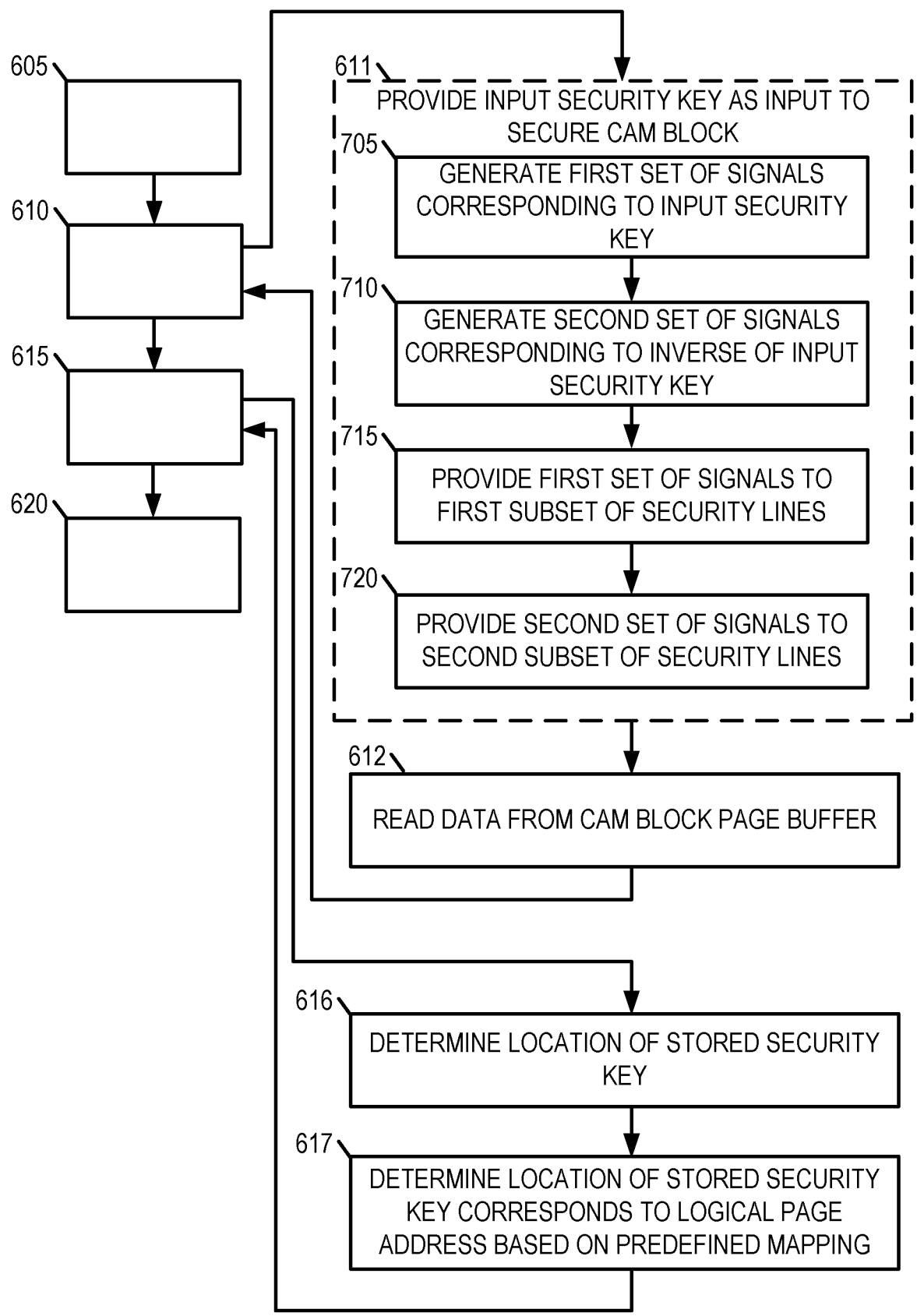

FIGS. 6 and 7 are flow diagrams illustrating an example method 600 for facilitating secure access to a memory device using a secure CAM, in accordance with some embodiments of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the local media controller 135 of FIG. 1. In some embodiments, the method is performed by the memory sub-system controller 115 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device receives an access request for a data unit within a memory device (e.g., the memory device 130). The access request may comprise a request to read data from the data unit, write data to the data unit, or erase data from the data unit. The request comprises a PPA corresponding to a physical location in the memory device, a LPA, which is a virtual address associated with the physical address, and an input security key associated with the LPA. The security key comprises a first sequence of M-bits (e.g., "100110101011"). The PPA and LPA may correspond to a block, a page, or a sub-page within the memory device.

In some embodiments, a memory sub-system controller (e.g., the memory sub-system controller 115) may receive a request from a host system (e.g., the host system 120) that comprises the LPA and the security key, and the memory sub-system controller may use a look-up table to identify the PPA associated with the LPAs. Consistent with these embodiments, the controller may submit the request to the processing device that includes the PPA, LPA, and input security key.

The processing device, at operation 610, verifies that the input security key matches a stored security key in a secure CAM block. The CAM block comprises an array (e.g., a NAND-type flash memory array) of memory cells. The memory cells of the array are arranged as strings and each of the strings stores a security key associated with a LPA. A string comprises a plurality of memory cells connected in series between a precharged match line and a page buffer. Each of the memory cells in each string is connected to one of a plurality of security lines. The processing device verifies that the input security key matches a stored security key based on an indication provided by the CAM block in response to the processing device vertically inputting the input security key onto the security lines.

If the input security key does not match a stored security key, the request fails and the processing device outputs an "access failure" error message or random data in response to the request. If the processing device verifies that the input security key matches a stored security key in the CAM, the processing device verifies the matching security key corresponds to the LPA in the request, at operation 615. As noted above, each string corresponds to a particular LPA and stores a security key corresponding to the particular LPA. Accordingly, in verifying that the matching security key corresponds to the LPA in the request, the processing device determines, based on a predetermined mapping, whether the string on which the matching security key is stored corresponds to the LPA included in the request.

If the processing device determines that the matching security key does not correspond to the LPA in the request (e.g., because the matching security key corresponds to a different LPA), the request fails and the processing device outputs an access failure message in response to the request. If the processing device determines that the matching security key does correspond to the LPA included in the request, the processing device performs an access operation (e.g., a read, write, or erase operation) at the physical page address in accordance with the request, at operation 620.

As shown in FIG. 7, the method 600 may, in some embodiments, include any one or more of operations 611, 612, 616, and 617. Consistent with these embodiments, the operations 611 and 612 may be performed as part of operation 610 where the processing device verifies that the input security key matches a stored security key in the secure CAM block. At operation 611, the processing device provides the input security key as input to the secure CAM block. As shown, the operation 611 may include operations 705, 710, 715, and 720.

At operation 705, the processing device generates a first set of voltage signals representing the input security key. That is, the first set of voltage signals represents a first sequence of M-bits corresponding to the input security key. The processing device also generates, at operation 710, a second set of voltage signals representing a comprising an inverse of the input security key. That is, the second set of voltage signals represents a second sequence of M-bits that is an inverse of the sequence of bits that form the input security key. Collectively, the first and second voltage signals may be referred to as a security key pattern.

In generating the security key pattern, the processing device generates the second sequence of bits by inverting the input security key and converting the first and second sequence of bits into the first and second signals, respectively. The processing device may alternatively generate a first signal based on the first sequence of bits and generate the second signal by generating an inverse of the first signal. In generating the first and second voltage signals, the processing device may use voltage V_high to represent a binary value of "1" and use a voltage V_low to represent a binary value of "0" where V_high is above a threshold voltage (Vt) and V_low is below Vt.

The processing device provides the first and second signals to security lines of a CAM block. More specifically, the processing device provides the first set of signals to a first subset of security lines of the secure CAM block (operation 715) and provides the second set of signals to a second subset of security lines (operation 720). As an example, the processing device provides a first signal representing a bit value from the first bit sequence to a first security line connected to a first memory cell in a complementary memory cell pair and provides a second search signal representing an inverse of the bit value to a second security line connected to a second memory cell in the complementary memory cell pair.

If the input security key is stored in the CAM block, input of the input security key causes any string on which input security key is stored to become conductive. Because matched lines are precharged, the conductive string allows the match line to discharge. That is, the string conducts a signal resulting from the match line discharging based on the security key stored on the string connected to the match line matching the input security key. The conductive string provides the signal to a page buffer connected at the other end of the string. The page buffer latches data in response to the signal provided as a result of the match line discharging. The latched data indicates that the match line connected to the page buffer stores a matching security key (i.e., a stored security key that is identical to the input security key).

At operation 612, the processing device determines whether any stored security key matches the input security key by reading data from page buffers of the CAM block. As noted above, a page buffer connected to a string on which a matching security key is stored stores data that indicates that a matching security key is stored by the string. Accordingly, if any one of the page buffers of the CAM block has latched data, the processing device determines that the CAM block stores at least one security key that matches the security key.

The operations 616 and 617 may, in some embodiments, be performed as part of operation 615 where the processing device verifies that the matching security key stored by the secure CAM corresponds to the LPA included in the request. At operation 616, the processing device determines a location of the matching security key within the CAM block. The location of the matching security key comprises a string in the CAM block, which may be assigned an identifier. Accordingly, the processing device determines which string(s) within the CAM block have a stored security key that match the input security key. The processing device may determine the location of matching security key based on the data read from the page buffer. The location of matching security key may comprise an identifier of a string within the array.

The processing device, at operation 617, determines, based on a predefined mapping, that the location of the matching security key in the CAM block corresponds to the LPA included in the request. As noted above, each string in the CAM block corresponds to a LPA and stores a security key associated with the LPA. Accordingly, the processing device verifies that the string on which the matching security key is stored is mapped to the LPA included in the request. In this way, the processing device ensures that the input security key is the security key associated with the requested LPA and not a different LPA. As an example, the request may specify a security key and a LPA of "1234". In this example, the processing device may determine that a security key stored at "String 5" in the CAM block matches the security key in the request. Before performing a read or write operation at the PPA included in the request, the processing device verifies that "String 5" stores the security key associated with the LPA of "1234."

EXAMPLES

Example 1 is a system comprising: a memory device comprising a primary memory block and a content-addressable memory (CAM) block storing a plurality of security keys, the CAM block comprising an array of memory cells organized into a plurality of strings, each string in the plurality of strings being mapped to one of a plurality of logical page addresses in accordance with a predetermined mapping, each string storing one of the plurality of security keys; and a processing device coupled to the memory device, the processing device to perform operations comprising: receiving an access request comprising a physical page address corresponding to the primary memory block, an input security key, and a logical page address corresponding to the physical page address; verifying the input security key matches a stored security key from the plurality of security keys stored by the CAM block based on an indication provided by the CAM block in response to receiving the input security key as input; verifying that the stored security key corresponds to the logical page address included in the access request based the predetermined mapping; and based on verifying that the stored security key corresponds to the logical page address included in the access request, performing an access operation at the physical page address in accordance with the request.

In Example 2, the subject matter of Example 1 optionally comprises verifying that the input security key matches the stored security key by performing comprising: providing the security key as input to the CAM block; and reading data from a page buffer of the CAM block, the page buffer being connected to a string from the plurality of strings that stores the stored security key, the data corresponding to the indication.

Example 3 comprises the subject matter of any one of Examples 1 or 2 and the string optionally comprises a plurality of memory cells connected in series between a pre-charged match line and the page buffer, the providing of the security key as input to the CAM block causes the string to provide a signal to the page buffer in response to the input security key matching the stored security key; the signal results from the precharged match line discharging through the string; and the page buffer stores the data in response to the signal.

Example 4 comprises the subject matter of any one of Examples 1-3 and each of the memory cells is connected to one of a plurality of security lines; the providing of the input security key as input to the CAM block optionally comprises: providing, to a first subset of the security lines, a first set of signals representing the input security key; and providing, to a second subset of the security lines, a second set of signals representing an inverse of the input security key.

In Example 5, the subject matter of any one or more of Examples 1-4 optionally comprises an inverter to generate an inverse of the input security key; and a level shifter to generate the first signal based on the input security key and to generate the second signal based on the inverse of the input security key.

Example 6 comprises the subject matter of any one or more of Examples 1-5 and the plurality of memory cells are configured as a plurality of complementary memory cell pairs; and a bit value of the stored security key is mapped to a complementary memory cell pair in the plurality of complementary memory cell pairs.

Example 7 comprises the subject matter of any one or more of Examples 1-6 and each of the memory cells is connected to one of a plurality of security lines; the complementary memory cell pair comprises: a first memory cell to store the bit value of the stored security key; and a second memory cell connected in series with the first memory cell, the second memory cell to store an inverse of the bit value;

a first security line in the plurality of security lines is connected to the first memory cell; and a second security line in a plurality of security lines is connected to the second memory cell.

Example 8 comprises the subject matter of any one or more of Examples 1-7 and the providing of the input security key as input to the CAM block optionally comprises: providing, to the first security line, a first signal representing an input bit value from the input security key; and the second security line receives a second signal representing an inverse of the input bit value.

Example 9 comprises the subject matter of any one or more of Examples 1-8 and wherein the verifying that the stored security key corresponds to the logical page address included in the access request comprises: determining a location of the stored security key in the CAM block, the location of the stored security key in the CAM block corresponding to a string from the plurality of strings; and determining, based on the predetermined mapping, that the location of the stored security key in the CAM block corresponds to the logical page address.

Example 10 comprises the subject matter of any one or more of Examples 1-11 and the memory device optionally comprises a negative and (NAND)-type flash memory device.

Example 11 is a method comprising: receiving, at a media controller, an access request comprising a physical page address corresponding to a primary memory block of a memory device, an input security key, and a logical page address corresponding to the physical page address; providing, by the media controller, the input security key as input to a content-addressable memory (CAM) block of the memory device, the CAM block storing a plurality of security keys, the CAM block comprising an array of memory cells organized into a plurality of strings, each string in the plurality of strings being mapped to one of a plurality of logical page addresses in accordance with a predetermined mapping, each string storing one of the plurality of security keys; verifying, by the media controller, the input security key matches a stored security key stored by the CAM block based on an indication provided by the CAM block in response to receiving the input security key as input; verifying, by the media controller, that the stored security key corresponds to the logical page address included in the access request based the predetermined mapping; and based on verifying that the stored security key corresponds to the logical page address included in the access request, performing, by the media controller, an access operation at the physical page address in accordance with the request.

Example 12 comprises the subject matter of Example 11 and the verifying that the input security key matches the stored security key optionally comprises reading data from a page buffer of the CAM block, the page buffer being connected to a string from the plurality of strings that stores the stored security key, the data corresponding to the indication.

Example 13 comprises the subject matter of any one of Examples 11 or 12 and the string optionally comprises a plurality of memory cells connected in series between a pre-charged match line and the page buffer, the providing of the security key as input to the CAM block causes the string to provide a signal to the page buffer in response to the input security key matching the stored security key; the signal results from the precharged match line discharging through the string; and the page buffer stores the data in response to the signal.

Example 14 comprises the subject matter of any one of Examples 11-13 and each of the memory cells is connected to one of a plurality of security lines; the providing of the input security key as input to the CAM block optionally comprises: providing, to a first subset of the security lines, a first set of signals representing the input security key; and providing, to a second subset of the security lines, a second set of signals representing an inverse of the input security key.

Example 15 comprises the subject matter of any one or more of Examples 11-14 and the plurality of memory cells are configured as a plurality of complementary memory cell pairs; and a bit value of the stored security key is mapped to a complementary memory cell pair in the plurality of complementary memory cell pairs.

Example 16 comprises the subject matter of any one or more of Examples 11-15 and each of the memory cells is connected to one of a plurality of security lines; the complementary memory cell pair comprises: a first memory cell to store the bit value of the stored security key; and a second memory cell connected in series with the first memory cell, the second memory cell to store an inverse of the bit value; a first security line in the plurality of security lines is connected to the first memory cell; and a second security line in a plurality of security lines is connected to the second memory cell.

Example 17 comprises the subject matter of any one or more of Examples 11-16 and the providing of the input security key as input to the CAM block optionally comprises: providing, to the first security line, a first signal representing an input bit value from the input security key; and the second security line receives a second signal representing an inverse of the input bit value.

Example 18 comprises the subject matter of any one or more of Examples 11-17 and wherein the verifying that the stored security key corresponds to the logical page address included in the access request comprises: determining a location of the stored security key in the CAM block, the location of the stored security key in the CAM block corresponding to a string from the plurality of strings; and determining, based on the predetermined mapping, that the location of the stored security key in the CAM block corresponds to the logical page address.

Example 19 comprises the subject matter of any one or more of Examples 11-18 and wherein the verifying that the stored security key corresponds to the logical page address included in the access request comprises: determining a location of the stored security key in the CAM block, the location of the stored security key in the CAM block corresponding to a string from the plurality of strings; and determining, based on the predetermined mapping, that the location of the stored security key in the CAM block corresponds to the logical page address.

Example 20 is non-transitory computer-readable storage medium comprising instructions that, when executed by a media controller, configure the media controller to perform operations comprising: receiving an access request comprising a physical page address corresponding to a primary memory block of a memory device, the request comprising an input security key and a logical page address corresponding to the physical page address; providing the input security key as input to a content-addressable memory (CAM) block of the memory device, the CAM block storing a plurality of security keys, the CAM block comprising an array of memory cells organized into a plurality of strings, each string in the plurality of strings being mapped to one of a plurality of logical page addresses in accordance with a predetermined mapping, each string storing one of the plurality of security keys; verifying the input security key matches a stored security key stored by the CAM block based on an indication provided by the CAM block in response to receiving the input security key as input; verifying that the stored security key corresponds to the logical page address included in the access request based the predetermined mapping; and based on verifying that the stored security key corresponds to the logical page address included in the access request, performing, by the media controller, an access operation at the physical page address in accordance with the request.

Example Machine Architecture

Figure 8:
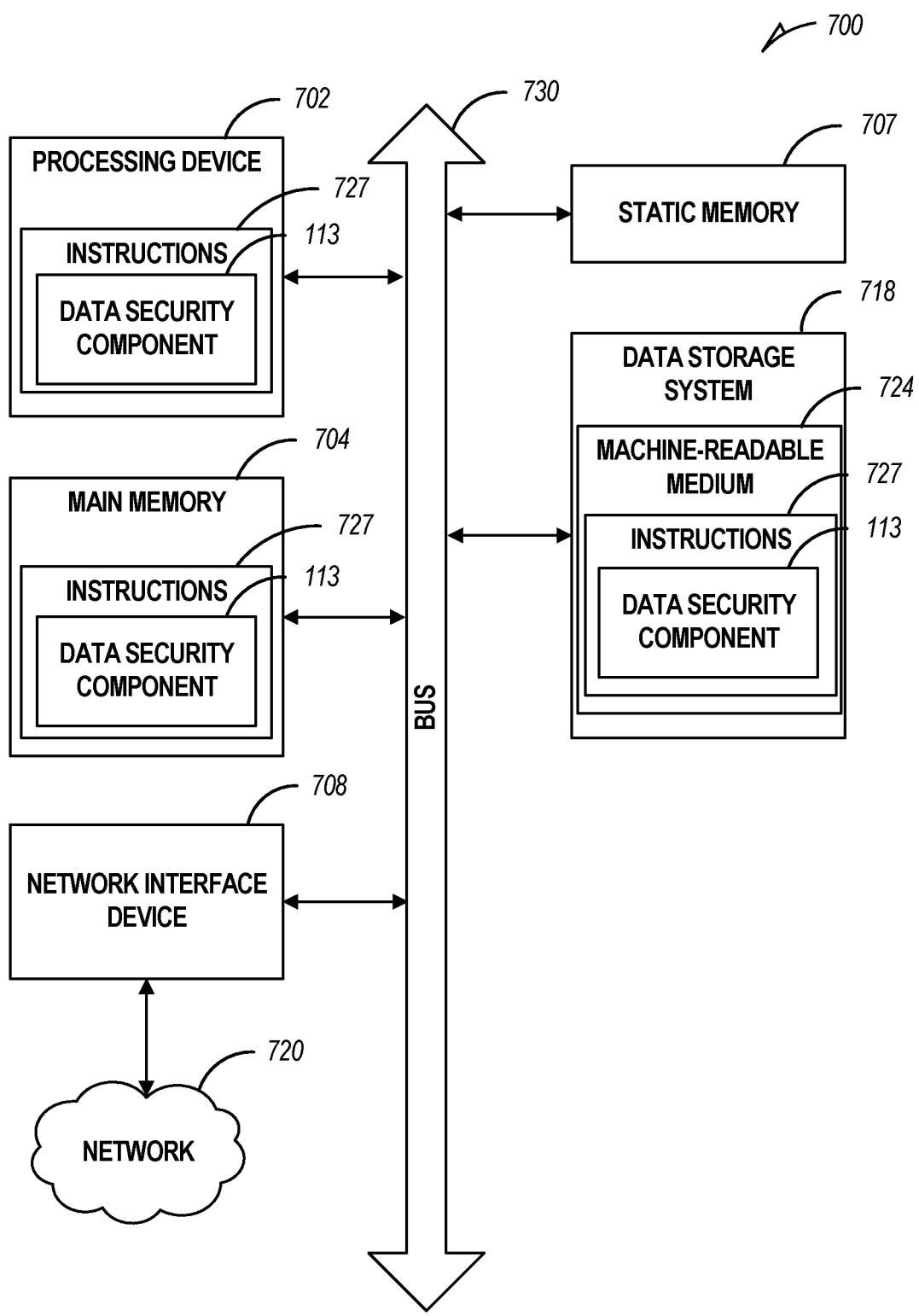
FIG. 8 is a block diagram of an example computer system in which embodiments of the present disclosure may operate.

FIG. 8 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data security component 113 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or Rambus DRAM (RDRAM), etc.), a static memory 707 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an ASIC, an FPGA, a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 727 or software embodying any one or more of the methodologies or functions described herein. The instructions 727 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 727 include instructions to implement functionality corresponding to a security component (e.g., the data security component 113 of FIG. 1). While the machine-readable storage medium 724 is shown in an example embodiment to be a single medium, the term "machine-readable storage medium" should be taken to include a single medium or multiple media that store the one or more sets of instructions 727. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., a computer-readable) storage medium such as a ROM, a RAM, magnetic disk storage media, optical storage media, flash memory devices, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
   a memory device comprising a primary memory block and a content-addressable memory (CAM) block storing a plurality of security keys, the CAM block comprising an array of memory cells organized into a plurality of strings, each string storing one of the plurality of security keys; and
   a processing device coupled to the memory device, the processing device to perform operations comprising:
   receiving an access request directed at the primary memory block, the access request including an input security key;
   verifying the input security key matches a stored security key from the plurality of security keys stored by the CAM block, the verifying that the input security key matches the stored security key comprising providing the input security key as input to the CAM block, the providing of the security key as input to the CAM block causing a string from the plurality of strings to provide a signal to a page buffer of the CAM block in response to the input security key matching the stored security key, the page buffer being connected to the string, the string comprising a plurality of memory cells connected in series between a pre-charged match line and the page buffer, the signal resulting from the pre-charged match line discharging through the string, the page buffer storing data indicating the input security key matches the stored security key in response to the signal; and
   based on verifying that the input security key matches the stored security key, performing an access operation at the primary memory block in accordance with the request.

2. The system of claim 1, wherein the verifying that the input security key matches the stored security key comprises:
   reading data from the page buffer of the CAM block.

3. The system of claim 1, wherein the operations further comprise verifying that the stored security key corresponds to a logical page address included in the access request based on a predetermined mapping prior to performing the access operation.

4. The system of claim 1, wherein:
   each of the plurality of memory cells is connected to one of a plurality of security lines;
   the providing of the input security key as input to the CAM block comprises:
   providing, to a first subset of the security lines, a first set of signals representing the input security key; and
   providing, to a second subset of the security lines, a second set of signals representing an inverse of the input security key.

5. The system of claim 4, wherein the processing device comprises:
   an inverter to generate an inverse of the input security key; and
   a level shifter to generate the first set of signals based on the input security key and to generate the second set of signals based on the inverse of the input security key.

6. The system of claim 1, wherein:
   the plurality of memory cells are configured as a plurality of complementary memory cell pairs; and
   a bit value of the stored security key is mapped to a complementary memory cell pair in the plurality of complementary memory cell pairs.

7. The system of claim 6, wherein:
   each of the memory cells is connected to one of a plurality of security lines;
   the complementary memory cell pair comprises:
   a first memory cell to store the bit value of the stored security key;
   a second memory cell connected in series with the first memory cell, the second memory cell to store an inverse of the bit value;
   a first security line in the plurality of security lines is connected to the first memory cell; and
   a second security line in a plurality of security lines is connected to the second memory cell.

8. The system of claim 7, wherein:
   the providing of the input security key as input to the CAM block comprises:
   providing, to the first security line, a first signal representing an input bit value from the input security key; and
   the second security line receives a second signal representing an inverse of the input bit value.

9. The system of claim 1, wherein the operations further comprise:
   determining a location of the stored security key in the CAM block, the location of the stored security key in the CAM block corresponding to a string from the plurality of strings; and
   determining, based on a predetermined mapping, that the location of the stored security key in the CAM block corresponds to a logical page address associated with a physical page address specified by the access request.

10. The system of claim 1, wherein the memory device comprises a negative and (NAND)-type flash memory device.

11. A system comprising:
a memory device comprising a primary memory block and a content-addressable memory (CAM) block storing a plurality of security keys, the CAM block comprising an array of memory cells organized into a plurality of strings, each string in the plurality of strings being mapped to one of a plurality of logical page addresses in accordance with a predetermined mapping; and
a processing device coupled to the memory device, the processing device to perform operations comprising:
accessing an input security key, the input security key being included in an access request directed at a physical address corresponding to the primary memory block;
providing the input security key to the CAM block;
accessing an indication provided by the CAM block that the input security key matches a stored security key from the plurality of security keys stored by the CAM block;
determining that the stored security key corresponds to a logical address associated with the physical address based on the predetermined mapping; and
performing an access operation at the primary memory block in accordance with the access request based on determining that the stored security key corresponds to the logical address.

12. The system of claim 11, wherein the accessing of the indication comprises reading data from a page buffer of the CAM block, the page buffer being connected to a string from the plurality of strings that stores the stored security key.

13. The system of claim 12, wherein:
the string comprises a plurality of memory cells connected in series between a pre-charged match line and the page buffer;
the providing of the security key as input to the CAM block causes the string to provide a signal to the page buffer in response to the input security key matching the stored security key;
the signal results from the pre-charged match line discharging through the string; and
the page buffer stores the data in response to the signal.

14. The system of claim 13, wherein:
each of the plurality of memory cells is connected to one of a plurality of security lines;
the providing of the input security key as input to the CAM block comprises:
providing, to a first subset of the security lines, a first set of signals representing the input security key; and
providing, to a second subset of the security lines, a second set of signals representing an inverse of the input security key.

15. The system of claim 14, wherein the operations further comprise:
generating an inverse of the input security key;
generating the first set of signals based on the input security key; and
generating the second set of signals based on the inverse of the input security key.

16. The system of claim 13, wherein:
the plurality of memory cells are configured as a plurality of complementary memory cell pairs; and
a bit value of the stored security key is mapped to a complementary memory cell pair in the plurality of complementary memory cell pairs.

17. The system of claim 16, wherein:
each of the memory cells is connected to one of a plurality of security lines;
the complementary memory cell pair comprises:
a first memory cell to store the bit value of the stored security key;
a second memory cell connected in series with the first memory cell, the second memory cell to store an inverse of the bit value;
a first security line in the plurality of security lines is connected to the first memory cell; and
a second security line in a plurality of security lines is connected to the second memory cell.

18. The system of claim 17, wherein:
the providing of the input security key as input to the CAM block comprises:
providing, to the first security line, a first signal representing an input bit value from the input security key; and
the second security line receives a second signal representing an inverse of the input bit value.

19. The system of claim 11, wherein the determining that the stored security key corresponds to the logical address included in the access request comprises:
determining a location of the stored security key in the CAM block, the location of the stored security key in the CAM block corresponding to a string from the plurality of strings; and
determining that the location of the stored security key in the CAM block corresponds to the logical page address.

20. A non-transitory computer-readable storage medium comprising instructions that, when executed by a processing device, configure the processing device to perform operations comprising:
accessing an input security key, the input security key being included in an access request directed at a physical address corresponding to a primary memory block of a memory device, the memory device comprising a content-addressable memory (CAM) block storing a plurality of security keys, the CAM block comprising an array of memory cells organized into a plurality of strings, each string in the plurality of strings being mapped to one of a plurality of logical page addresses in accordance with a predetermined mapping;
providing the input security key to the CAM block;
accessing an indication provided by the CAM block that the input security key matches a stored security key from the plurality of security keys stored by the CAM block:
determining that the stored security key corresponds to a logical address associated with the physical address based on the predetermined mapping; and
performing an access operation at the primary memory block in accordance with the access request based on determining that the stored security key corresponds to the logical address.

* * * * *